United States Statutory Invention Registration [19]

[11] Reg. Number: H537

Pinder et al. [43] Published: Oct. 4, 1988

[54] X-RAY TUBE HOLDER FOR ENGINE INLET COWL

[75] Inventors: Hansel N. Pinder, Houston, Del.; Antonio P. Buchanan, Lubbock, Tex.

[73] Assignee: The United States of America as represented by the Secretary of the Air Force, Washington, D.C.

[21] Appl. No.: 125,635

[22] Filed: Nov. 24, 1987

[51] Int. Cl.[4] ..... H05G 1/02

[52] U.S. Cl. ..... 378/193; 378/58

[56] References Cited

U.S. PATENT DOCUMENTS

| | | | |
|---|---|---|---|
| 3,190,125 | 10/1961 | Holz | 73/432 |
| 3,992,627 | 11/1976 | Stewart | 250/312 |
| 4,092,537 | 5/1978 | Stewart | 250/314 |

*Primary Examiner*—Stephen C. Buczinski
*Assistant Examiner*—Linda J. Wallace
*Attorney, Agent, or Firm*—Fredric L. Sinder; Donald J. Singer

[57] ABSTRACT

An X-ray tube holder is described for holding X-ray tubes in proper alignment for performing radiographic leading edge cowl assembly exposures. The holder has a base to which are attached a holding arm and a fixed angle rest for holding the X-ray tube to the base. A pair of latches are attached to the base on the other side from the holding arm and fixed angle rest to attach the holder to air outlet apertures on the inside of an aircraft engine cowl. The holder may be moved around the inside of the cowl to make exposures at various locations.

3 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

X-RAY TUBE HOLDER FOR ENGINE INLET COWL

RIGHTS OF THE GOVERNMENT

The invention described herein may be manufactured and used by or for the Government of the United States for all governmental purposes without the payment of any royalty.

BACKGROUND OF THE INVENTION

The present invention relates generally to X-ray tube holders, and more specifically to an X-ray tube holder for X-raying structures inside the leading edge assembly of aircraft jet engine inlet cowls.

The internal parts of an aircraft jet engine are subject to large stresses and must be examined periodically so that fatigue damaged parts can be replaced before a catastrophic failure occurs. The inlet cowl anti-ice forward duct assembly, for example. is subject to vibration and high temperatures followed by cooling. The anti-ice forward duct assembly typically comprises welded titanium tubing connected by titanium connectors and attached inside the leading edge of the engine cowl by titanium, stainless steel or aluminum brackets and clips. Fatigue cracks, especially in the bracket assemblies, may easily develop. Regular inspection can reveal beginning cracks before a complete failure occurs. X-ray radiography is a particularly useful method for revealing such beginning cracks on installed engine parts. X-rays can reveal defects inside the part or on sections hidden because of attachment of the part to the engine. X-rays are also advantageous in that they often can be used through cowlings or other engine coverings so that the coverings do not have to be removed to perform the inspection.

Unfortunately, the advantages of X-rays are offset by the dangers to human aircraft mechanics from X-radiation exposure procedures must be designed to protect the mechanics. Typically, a support structure is provided for mounting an X-ray tube in line with or perpendicular to the area to be radiographed so that the mechanic can remove himself to a safe area while the exposure is being made. Often, however, a requirement for regular X-ray inspection for various parts is made before suitable X-ray tube support structures are designed. Written Technical Orders are prepared stating, without further description, that appropriate AGE (applicable ground equipment) aids should be used. In many cases, a appropriate AGE does not even exist at the time the Technical Order is written. Aircraft mechanics frequently must improvise solutions at the time the X-ray exposures are made. Such improvised solutions are generally time consuming and less reliable than using apparatus made specifically for the job.

It is seen, therefore, that there is a need for X-ray tube holders for holding X-ray tubes in alignment to various aircraft sections for parts inspection.

It is, therefore, a principal object of the present invention to provide an X-ray tube holder for an aircraft jet engine inlet cowl.

It is another object of the present invention to provide an X-ray tube holder that is easily moved around the cowling to permit a series of X-ray radiographs to be taken at all recommended inspection points.

It is a further object of the present invention to provide an X-ray tube holder that holds an X-ray tube at a pre-selected preferred angle to the cowl surface.

Another feature of the present invention is that it easily adapts to mount at other aircraft locations to provide for safe X-ray exposures.

An advantage of the present invention is that it is made from low cost parts and is easily fabricated.

SUMMARY OF THE INVENTION

In accordance with the foregoing principles, objects, and features, the present invention provide a novel X-ray tube holder for performing radiographic leading edge cowl assembly exposures. The unique discovery of the present invention is that a novel assembly of a base, a holding arm and a fixed angle rest for securing an X-ray tube to the base, and a pair of latches for securing the base to the air outlet apertures of an inlet cowl, makes an X-ray tube holder providing improved safety and convenience over the prior art.

Accordingly, the present invention is directed to an X-Ray tube holder for holding an X-ray tube in alignment next to a structure to be X-rayed including a base having an upper side, a lower side and an opening for receipt of an anode of the X-ray tube. A first rest for supporting an edge of the X-ray tube on its anode end is attached to the upper side of the base next to the opening. A holding arm has its first end pivotably attached to the first rest and a second end with first means for attaching to an edge of the X-ray tube on its base end. The holding arm includes means for extending and contracting its length. A fixed angle second rest has a first end attached to the upper side of the base next to the opening on a side of the opening opposite from the first rest and a second end with second means for attaching to an edge of the X-ray tube on its base end. The fixed angle second rest includes means for supporting a side of the X-ray tube at a pre-selected fixed angle to the base. The fixed angle second rest also includes means for extending and retracting the second means for attaching and means for attaching the base to the structure to be X-rayed.

The first and second means for attaching to an edge of the X-ray tube may each comprise a hook.

The means for attaching the base to the structure to be X-rayed includes a pair of slots through the base on either side of the opening. A pair of shafts each extend through one of the slots. The shafts are generally threaded on their portions above the upper side of the base. A pair of sleeves each surround one shafts on the shaft portion above the upper side of the base. The sleeves include a threaded portion for threading onto the threaded portion of each shaft. A pair of feet are attached one each to the end of each shaft below the lower side of the base, so that turning the sleeves will raise and lower the feet in relation to the base.

DESCRIPTION OF THE DRAWINGS

The present invention will be more clearly understood from a reading of the following detailed description in conjunction with the accompaning, drawings wherein.

DETAILED DESCRIPTION

Figure 1:
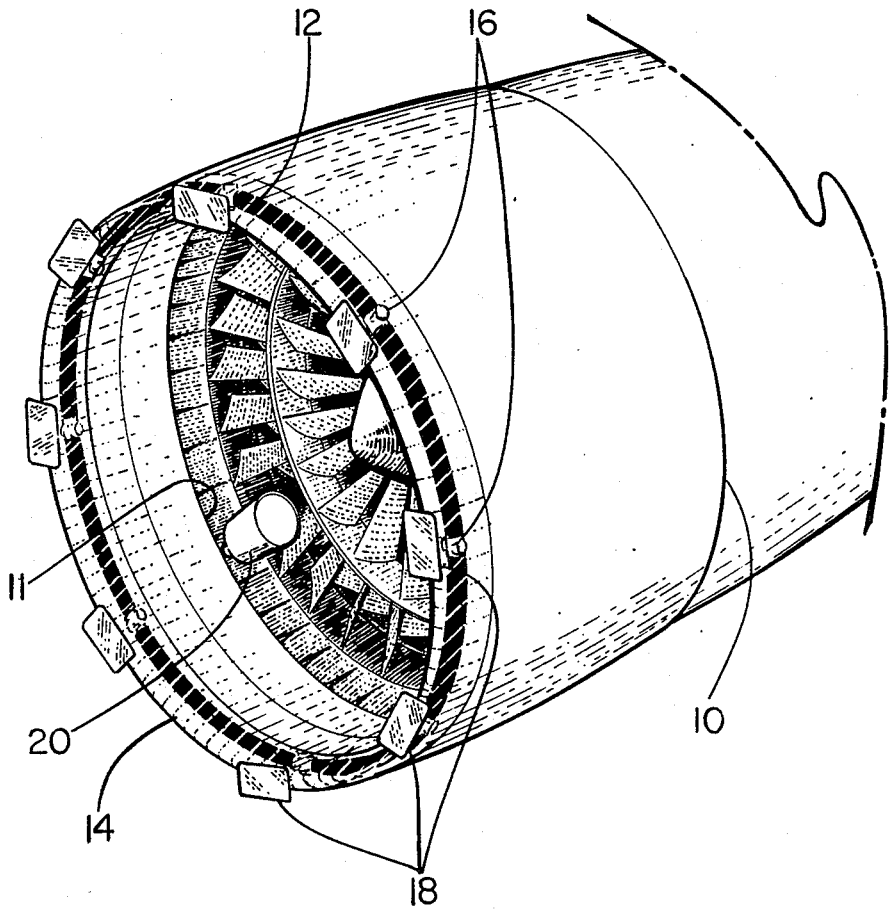
FIG. 1 is a simplified perspective view of an aircraft jet engine inlet cowl showing the leading edge location of the anti-ice forward duct tubing and typical positions for an X-ray tube and X-ray film for inspection.

Referring now to FIG. 1. there is shown a simplified perspective view of an aircraft jet engine inlet cowl 10. An anti-ice forward duct assembly 12 is located inside leading edge 14 of cowl 10. Fatigue cracks generally occur at bracket and connector locations 16. To inspect the brackets and connectors, sheets 18 of X-ray film are secured to the outside of leading edge 14 and an X-ray tube 20 is positioned at corresponding positions inside cowl 10 to expose the brackets and connectors. X-ray tube 20 radiates X-radiation in a panoramic direction generally perpendicular to its axis.

Figure 2:
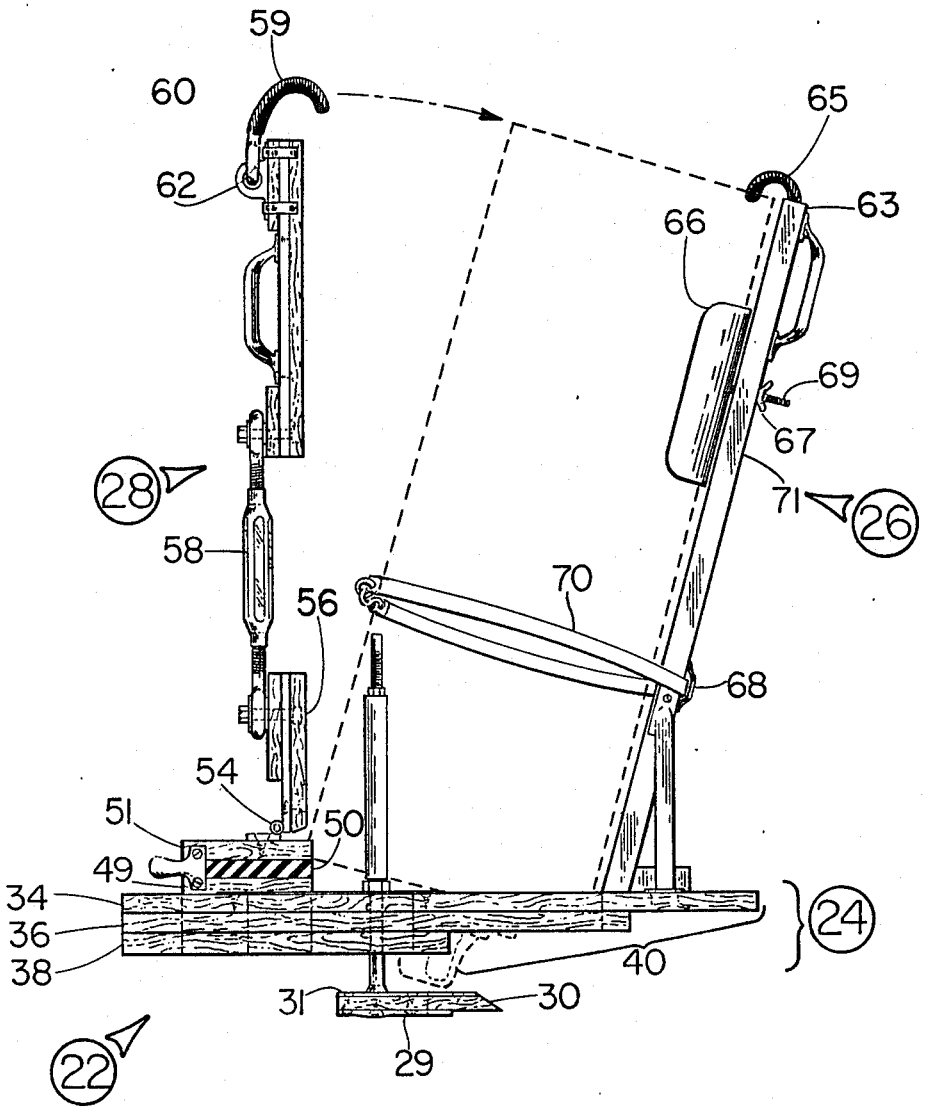
FIG. 2 is a side view of an X-ray tube holder according to the teachings of the present invention showing its base, a holding arm and a fixed angle rest for holding the X-ray tube to the base, and latches for attaching the holder assembly to air outlet apertures along the inside of the inlet cowl.
Figure 3:
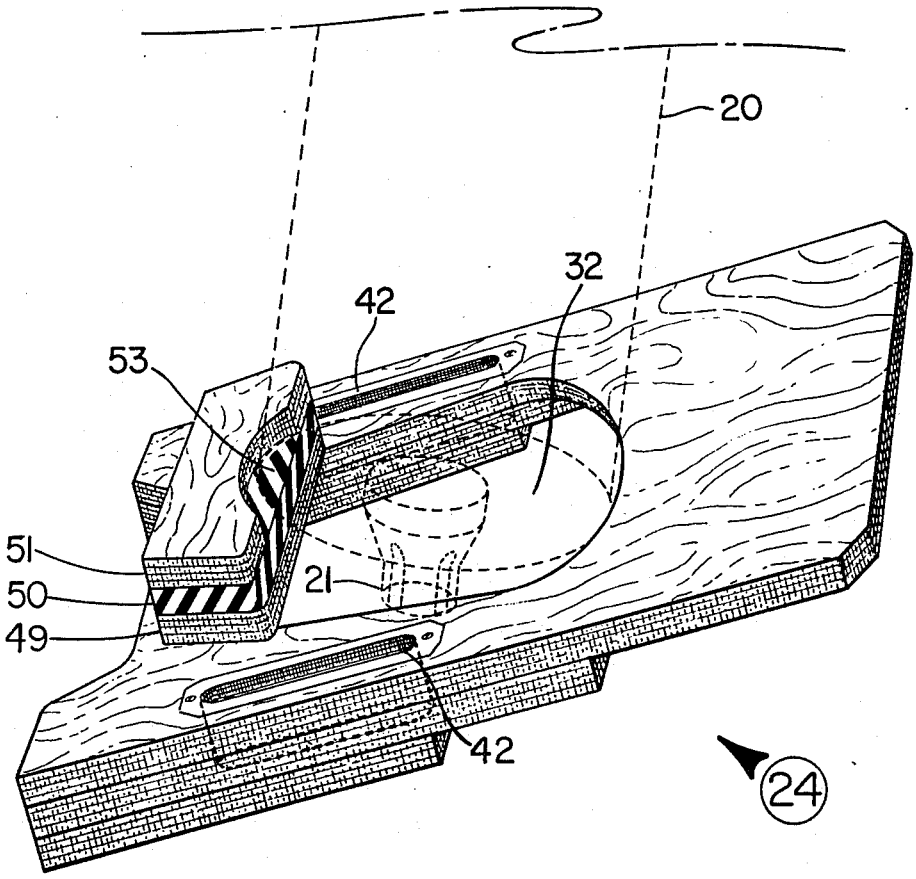
FIG. 3 is a perspective view of the X-ray tube holder base showing a dashed line representation of an X-ray tube and its intended position relative to the base; and, FIG. 4 is a perspective view of the X-ray tube holder and an X-ray tube showing their attachment to an aircraft inlet cowl.

FIG. 2 is a side view of an X-ray tube holder 22 according to the teachings of the present invention. Holder 22 comprises a base 24 to which are attached a holding arm 28 and a fixed angle rest 26. Latches 30 extend from the bottom of the base for attaching the base to air outlet apertures 11, such as are present on C-5A or C-5B military aircraft. on the inside of cowl 10. FIG. 3 is a perspective view of base 24 showing opening 32 through which anode 21 of X-ray tube 20 (shown as a dashed line in FIGS. 2 and 3) extends for exposing X-ray film sheets 18. Anode 21 radiates X-radiation in a panoramic direction generally perpendicular to the direction of the axis of X-ray tube 20. Holding arm 28 and fixed angle rest 26 hold X-ray tube 20 on base 24 in the general position shown in FIG. 3.

Base 24 includes three layers 34, 36 and 38 of plywood glued together to provide a step 40 for providing spacing between X-ray tube anode 21 and cowl 10. Slots 42 are cut through step 40 to provide a sliding adjustment range for shaft bolts 44 attached to latch feet 30. Rubber sleeves 45 surround steel tubes 46, which are welded to nuts 48, to provide a hand grip surface for hand tightening and loosening of latch feet 30 relative to base 24. Metal plates 47 protect the wood surface of base 24 from gouging. Latch feet 30 include steel plates 29 welded to bolts 44 and covered by a phenolic layer 31 to provide a softer surface that will not mar aircraft surfaces.

Additional wood layers 49 and 51 and rubber layer 50; provide a raised supporting rest for attaching holding arm 28 and as a rest for an edge of X-ray tube 20. Layer 51 includes a cutout to expose a portion of rubber layer 50 to form a rubber ledge 53. Hinge 54 and pivot 56 allow rotation of holding arm 28 about two axes and turnbuckle 58 provides for adjustment of its length. Hinged hook 59 attaches through an eyelet 60 and a loop 62 to provide freedom of movement to make hooking holding arm 28 to the base of X-ray tube 20 more convenient. A sealant coating is recommended over the wooden components of holder 22.

A fixed angle rest 26 attaches to base 24 to hold X-ray tube 20 at a pre-selected preferred angle. Fixed angle rest 26 includes a hook 65, which is attached to an arm 63 by a wingnut 67 and bolt 69 through a slot 71 in arm 63 to provide for adjusting the extension of hook 65. A curved X-ray tube rest plate 66 also attaches to arm 63 of fixed angle rest 26 to provide a surface for supporting a side of X-ray tube 20. Strap holder 68 retains resilient failsafe strap 70 for holding X-ray tube 20 securely against curved rest plate 66.

Figure 4:
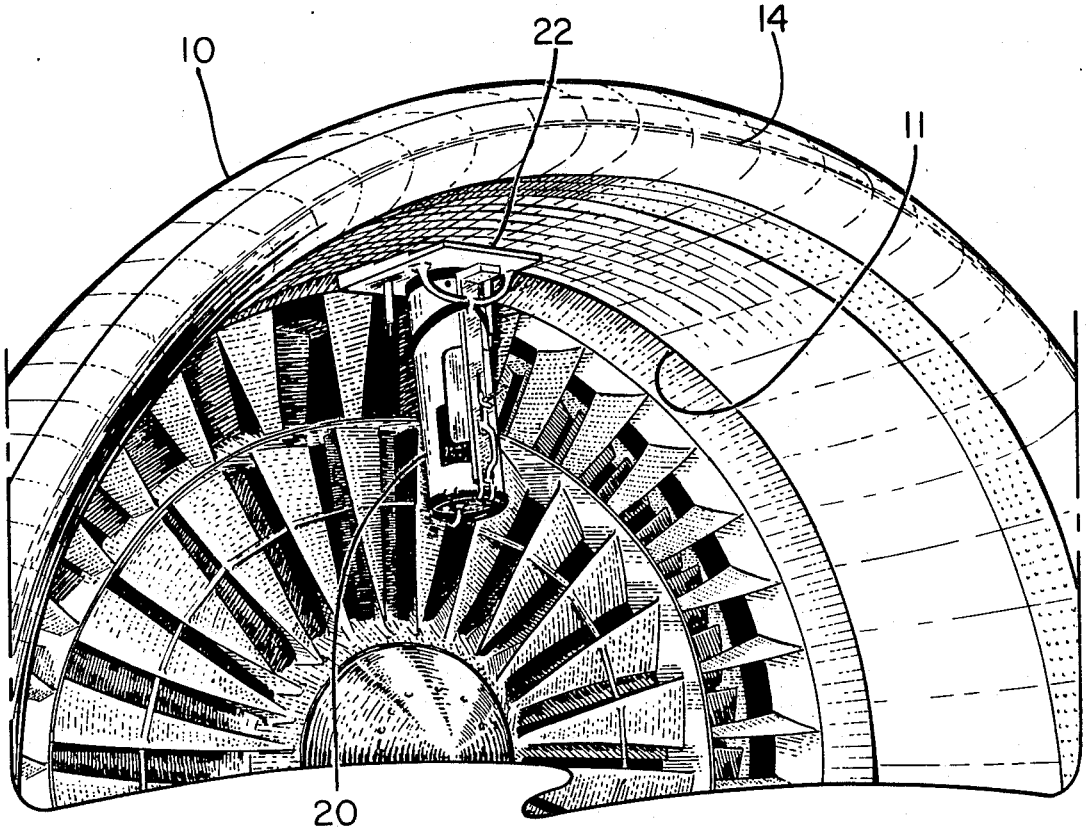

FIG. 4 shows a typical attachment of X-ray tube 20 to an engine inlet cowl 10 by using X-ray tube holder 22 attached to engine inlet cowl 10 at an air outlet aperture 11. X-ray tube 20 is installed in holder 22 by sliding anode 21 through base opening 32 until an edge of X-ray tube 20 rests upon ledge 53. Hook 65 is extended to hook over the base of X-ray tube 20, then retracted and wingnut 67 tightened to lock arm 63 in place. Strap 70 is then tightened around X-ray tube 20 to further hold it against rest plate 66. Finally, hinged hook 59 is hooked over the base of X-ray tube 20 by turning turnbuckle 58 to first extend and then retract the hook. X-ray tube holder 22 and X-ray tube 20 are attached to the inside surface of the inlet cowl 10 by inserting latch feet 30 through air outlet aperture 72 and turning rubber sleeve 45 to tighten latch feet 30 against the edges of air outlet aperture 11. After an X-ray exposure is made, latch feet 30 are loosened and removed and X-ray tube holder 22 moved to the next position on the inside of inlet cowl 10.

Those skilled in the art will see that the unique construction of X-ray tube holder 22 permits unattended alignment of an X-ray tube over different locations on the surface of an aircraft for X-ray exposures. Modifying the type of latch will permit attachment to a variety of different aircraft surfaces. The base may be made of other suitable materials in addition to the described wood.

It is understood that other modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

We claim:

1. An X-Ray tube holder for holding an X-ray tube, having an anode end and a base end, in alignment next to a structure to be X-rayed, comprising:

(a) a base having an upper side, a lower side and an opening for receipt of an anode of the X-ray tube;

(b) a first rest for supporting an edge of the X-ray tube on its anode end, wherein the first rest is attached to the upper side of the base next to the opening;

(c) a holding arm having a first end pivotably attached to the first rest and a second end having first means for attaching to an edge of the X-ray tube on its base end, wherein the holding arm includes means for extending and contracting its length;

(d) a fixed angle second rest having a first end attached to the upper side of the base next to the opening on a side of the opening opposite from the first rest and a second end having second means for attaching to an edge of the X-ray tube on its base end, wherein the fixed angle second rest includes means for supporting a side of the X-ray tube at a pre-selected fixed angle to the base, and wherein the fixed angle second rest further includes means for extending and retracting the second means for attaching; and, (e) means for attaching the base to the structure to be X-rayed.

2. The X-ray tube holder according to claim 1, wherein the first and second means for attaching to an edge of the X-ray tube each comprise a hook.

3. The X-ray tube holder according to claim 1, wherein the means for attaching the base to the structure to be X-rayed comprise:

(a) a pair of slots through the base on either side of the opening;

(b) a pair of shafts extending one each through each slot, the shafts being generally threaded on their portions above the upper side of the base;

(c) a pair of sleeves one each surrounding each shaft on each shaft portion above the upper side of the base, the sleeves including a threaded portion for threading onto the threaded portion of each shaft; and, (d) a pair of feet attached one each to the end of each shaft below the lower side of the base, so that turning the sleeves will raise and lower the feet in relation to the base.

* * * * *